(12) United States Patent
Kenny et al.

(10) Patent No.: US 7,638,709 B2
(45) Date of Patent: Dec. 29, 2009

(54) FLUOROPOLYMER WIRE INSULATION

(75) Inventors: Robert D. Kenny, Cincinnati, OH (US);
John L. Netta, Newark, DE (US);
Sundar Kilnagar Venkataraman,
Avondale, PA (US); Robert Thomas Young, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 93 days.

(21) Appl. No.: 12/116,984

(22) Filed: May 8, 2008

(65) Prior Publication Data

US 2008/0283271 A1    Nov. 20, 2008

Related U.S. Application Data

(60) Provisional application No. 60/930,277, filed on May 15, 2007.

(51) Int. Cl.
*H01B 7/00* (2006.01)
(52) U.S. Cl. .................. 174/28; 174/110 R; 174/120 R
(58) Field of Classification Search ...... 174/110 R–110 FC, 28, 36, 120 R, 120 C, 102 R
See application file for complete search history.

(56) References Cited

U.S. PATENT DOCUMENTS

| | | | |
|---|---|---|---|
| 4,029,868 A | 6/1977 | Carlson | |
| 4,742,122 A | 5/1988 | Buckmaster et al. | |
| 4,743,658 A | 5/1988 | Imbalzano et al. | |
| 4,764,538 A | 8/1988 | Buckmaster et al. | |
| 4,877,815 A | 10/1989 | Buckmaster et al. | |
| 5,543,217 A * | 8/1996 | Morgan | 428/375 |
| 5,677,217 A * | 10/1997 | Tseng | 438/217 |
| 5,677,404 A | 10/1997 | Blair | |
| 5,726,214 A | 3/1998 | Buckmaster et al. | |
| 6,541,588 B1 | 4/2003 | Kaulbach et al. | |
| 6,623,680 B2 | 9/2003 | Kaulbach et al. | |
| 6,743,508 B2 | 6/2004 | Kono et al. | |
| 6,838,545 B2 | 1/2005 | Chapman et al. | |
| 7,122,609 B2 | 10/2006 | Earnest, Jr. et al. | |
| 2004/0242783 A1 * | 12/2004 | Yabu et al. | 525/199 |

FOREIGN PATENT DOCUMENTS

| | | |
|---|---|---|
| EP | 0 423 995 B1 | 4/1991 |
| EP | 0 684 272 A1 | 11/1995 |
| EP | 1260526 A1 * | 11/2002 |
| EP | 1 462 465 A1 | 9/2004 |
| JP | 2002293831 * | 10/2002 |
| WO | WO 97/02301 | 1/1997 |
| WO | WO 02/42372 A1 | 5/2002 |
| WO | WO2006/009761 A1 | 1/2006 |

OTHER PUBLICATIONS

PCT International Search Report and Written Opinion for International Application No. PCT/US2008/063626 dated Jul. 11, 2008.

* cited by examiner

*Primary Examiner*—William H Mayo, III

(57) ABSTRACT

FEP compositions are provided that provide foam insulation in coaxial cable that surpasses the return loss obtained when PFA is used to make the foamed insulation, one composition comprising a blend of tetrafluoroethylene/hexafluoropropylene copolymers, one of said copolymers exhibiting a strip force of at least about 3 lbf (13.3 N) and another of said copolymers exhibiting a strip force no greater than about 2.5 lbf (11.1 N), said blend exhibiting a strip force of at least about 3 lbf (13.3 N), each said strip force being the force necessary to break adhesion between conductor and said one of said copolymers, said another of said copolymers, and said blend, respectively, and another composition comprising tetrafluoroethylene/hexafluoropropylene copolymer having an MFR of no greater than about 16 g/10 min and containing —$CF_3$ end groups and an effective amount of wire affinity end groups to exhibit a strip force of at least about 3 lbf (13.3 N), said strip force being the force necessary to break adhesion between conductor and said copolymer, the coaxial cable exhibiting an average return loss of no greater than about −26 dB at 800 MHz to 3 GHz and having a void content of about 20 to 65% and (b) forming an outer conductor over said foamed insulation.

19 Claims, No Drawings

FLUOROPOLYMER WIRE INSULATION

BACKGROUND OF THE INVENTION

This invention relates to the replacement of tetrafluoroethylene/perfluoro(alkyl vinyl ether) copolymer wire insulation by tetrafluoroethylene/hexafluoropropylene copolymer wire insulation.

EP 0 423 995 discloses the fluorine treatment of tetrafluoroethylene/perfluoro(alkyl vinyl ether) copolymer (PFA) and tetrafluoroethylene/hexafluoropropylene copolymer (FEP) to reduce the dissipation factor for these copolymers, enabling cable using these copolymers as insulation for the conductor in the cable to exhibit reduced attenuation of the transmitted signal. As shown in Table 1, dissipation factor for the FEP at 1 GHz is reduced from 0.00112 to 0.00057 by fluorination, and for PFA at 500 MHz, the dissipation factor is reduced from 0.00083 to about 0.000366 by fluorination. According to U.S. Pat. No. 4,743,658, which is referred to in '995 for the fluorination process, the fluorinated PFA contains less than 6 unstable end groups per $10^6$ carbon atoms. Similar results are obtained when FEP is fluorinated by the process of the '658 patent. For both copolymers, the fluorination converts the polymer unstable end groups, typically —COF, —CONH$_2$, —COOH, and/or —CH$_2$OH, resulting from the copolymerization process to the stable end group —CF$_3$. PFA exhibits a lower dissipation factor than FEP both before and after fluorination, and the dissipation factor reduction for the PFA arising from fluorination is greater than for the FEP. As a result of this difference in dissipation factor as well as the difference in melting points (PFA melts at about 305-310° C. and FEP melts at about 250-255° C.), these copolymers have found different utilities as wire insulation.

Especially for the FEP, steps have been taken to greatly increase line speed in the extrusion coating operation. U.S. Pat. No. 5,677,404 discloses FEP compositions that improve line speed. U.S. Pat. Nos. 6,541,588 and 6,623,680 disclose the processing condition at the time of fluorination to improve line speed. U.S. Pat. No. 6,743,508 discloses an increase in adhesion between the wire and the FEP insulation to improve line speed. The trend in these patents is to achieve line speeds of 500 m/min and higher, using FEP having a melt flow rate (MFR) of at least about 24 g/10 min to produce a solid insulation over wire.

Recently, there has developed a desire to replace foamed PFA wire insulations by foamed FEP insulation in coaxial cable, because FEP is a less expensive copolymer than PFA. The production of foamed insulation coaxial cable is different from the high line speed production of solid wire insulation, arising from the cable construction and the foaming process, resulting in low line speeds, i.e. less than 90 ft/min (27.4 m/min) in commercial operation for the most common dimension coaxial cable wherein the central conductor is 0.032 in (0.8 mm) in diameter and the foamed insulation is 0.135 in (3.4 mm) in diameter, void content being about 55%. Low MFR FEP, i.e. MFR of about 7 g/10 min, has been used to produce the foam and to have the coaxial cable pass the NFPA 262 test, with respect to resistance to burning and smoking. This FEP is FEP A of the Examples. The low MFR FEP resists dripping and therefore is sufficiently non-smoking that the coaxial cable passes the NFPA 262 test, in contrast to high MFR, which can only be foamed at very low line speed to enable the foam to set up upon exit from the extruder and which drips and smokes when the coaxial cable containing this FEP is subjected to the NFPA 262 test, causing such cable to fail this test.

While coaxial cable containing foamed FEP insulation made from low MFR FEP can be made, which passes the NFPA 262 test, such cable suffers from the disadvantage that it has an unacceptably high return loss of at least about −20 dB as compared to the return loss of about −24 dB that is achievable with coaxial cable having foamed PFA as the insulation. These return losses are the general results obtained in commercial practice. Occasionally better return loss can be achieved with this FEP foamed insulation, but this is unsustainable on a continuing or reproducible basis. The higher the return loss, the smaller is the negative numerical value, e.g. −19 dB is a higher return loss than −20 dB. The effect of the higher return loss for the foamed FEP insulation is that this insulation cannot replace PFA as the foamed insulation in coaxial cable in applications requiring low return loss in the range 800 MHz to 3 GHz. The return losses mentioned above and hereinafter are measured across this range and averaged as further described in the Examples, this being the preferred frequency range for measurement to achieve widespread use for the coaxial cable. The 3 GHz frequency is merely a convenient stopping point for the frequency sweep, starting from 800 MHz; the sweep can continue to even higher frequencies than 3 GHz, without appreciably affecting the average return loss measurement result. FEP has the additional disadvantage as compared to PFA of higher dissipation factor than PFA. Both higher dissipation factor and high return loss contribute to increased loss (attenuation) of the signal transmitted by the coaxial cable.

Thus, FEP foamed insulation has not been able to replace PFA foamed insulation in coaxial cable applications requiring the return loss to be at least as good as when the PFA foamed insulation is used at 1 GHz.

SUMMARY OF THE INVENTION

The present invention provides FEP compositions that are foamable to produce foamed insulation for coaxial cable that exhibits a lower return loss than PFA foamed insulation. Notwithstanding that the dissipation factor for FEP is greater than for PFA, the improvement in return loss is such that attenuation of the cable is reduced.

One embodiment of the present invention is the composition comprising a blend of tetrafluoroethylene/hexafluoropropylene copolymers (FEPs), one of said copolymers exhibiting a strip force of at least about 3 lbf (13.3 N) and another of said copolymers exhibiting a strip force no greater than about 2.5 lbf (11.1 N), said blend exhibiting a strip force of at least about 3 lbf (13.3 N), each said strip force being the force necessary to break adhesion between conductor and said one of said copolymers, said another of said copolymers, and said blend, respectively. The low MFR FEP described above typically exhibits an average strip force of less than 2 lbf (8.9 N). Embodied in the present invention is the discovery that the average return loss at 800 MHz to 3 GHz of FEP can be greatly improved to even exceed that of foamed PFA insulation in coaxial cable by modifying the FEP so as to increase its adhesion to the central conductor of the coaxial cable. Thus, foamed insulation formed from the composition of the present invention exhibits an average return loss at 800 MHz to 3 GHz of no greater than about −26 dB. Such composition is foamable in accordance with the present invention when the composition comprises foam cell nucleating agent. Return loss is measured on the coaxial cable. The return loss, however, can be attributed to the foamed insulation.

According to one embodiment of this composition, the copolymer having the strip force of at least about 3 lbf (13.3 N) has an MFR of at least about 16 g/10 min and the copolymer having the strip force of no greater than about 2.5 lbf (11.1 N) has an MFR of no greater than about 10 g/10 min. This embodiment enables the low MFR (7 g/10 min) FEP described above to be used as the low strip force FEP. Preferably, the MFR of the blend is no greater than about 16 g/10 min, and the MFR of the higher strip force FEP is greater than about 20 g/10 min. Low MFR for the blend is desirable so that the foam structure can set up, i.e. not continue to flow or sag, during cooling. Even lower MFRs are desirable as the thickness of the foamed insulation increases within the range of coaxial cable foamed insulation thicknesses.

The modification of the FEP to provide this improvement in return loss is that the copolymer having said strip force of at least about 3 lbf (13.3 N) has wire affinity end groups and stable end groups. These wire affinity groups are generally the as-polymerized end groups, as mentioned above, present in the FEP prior to any stabilization treatment. Typically, these end groups are substantially removed by stabilization treatment. In the practice of the present invention, the stabilization treatment is conducted less rigorously, so that an effective amount of wire affinity end groups are present in the stabilization-treated copolymer to provide the high strip force. Preferably this strip force is at least about 4 lbf (17.9 N). In effect, the copolymer having the low strip force is stabilized copolymer in the sense of commercial practice providing the stabilized copolymer, and the copolymer having the high strip force is partially stabilized, i.e. less stabilized than commercially stabilized copolymer. Preferably, the high strip force copolymer has about 30 to 120 of wire affinity end groups per $10^6$ carbon atoms.

The stable end groups of the high strip force copolymer are —$CF_2H$ or —$CF_3$. These end groups are obtained by the preferred method of obtaining stabilizing FEP, namely to expose the FEP after its formation by polymerization either to steam or fluorine at elevated temperature to convert unstable end groups formed during the polymerization to stable end groups. In the case of steam treatment, often called humid heat treatment, the unstable end groups are converted to —$CF_2H$ end groups, which are stable in the sense of not decomposing to produce bubbles within the FEP under the melt extrusion conditions. In the case of fluorination, the stable end group formed is —$CF_3$. According to one embodiment of the present invention, one of the copolymers of the blend contains —$CF_2H$ end groups and the other copolymer contains —$CF_3$ end groups, whereby the blend is a mixture of copolymers containing these different end groups. The FEP MFR of 7 g/10 min has been stabilized by humid heat treatment to have the —$CF_2H$ end group. When this FEP is used, the high strip force FEP preferably has the —$CF_3$ end group as the stable end group. This reduces the dissipation factor of the blend from the 0.0009 at 1 GHz for the low MFR FEP. Preferably the dissipation factor of the high strip force copolymer will be no greater than about 0.0006, more preferably no greater than about 0.0005, at 1 GHz. The —$CF_3$ end group stabilized FEP exhibits a dissipation factor of about 0.00035 at 1 GHz. Preferably, the dissipation factor of the high strip force copolymer containing the —$CF_3$ end groups will be about 0.0001 greater than that of the stabilized FEP at 1 GHz, this higher dissipation factor reflecting the presence of the wire affinity end groups.

Another embodiment of the present invention is the composition comprising tetrafluoroethylene/hexafluoropropylene copolymer having an MFR of no greater than about 16 g/10 min and containing —$CF_3$ end groups and an effective amount of wire affinity end groups to exhibit a strip force of at least about 3 lbf (13.3 N), said strip force being the force necessary to break adhesion between conductor and said copolymer. Preferably, the number of said —$CF_3$ end groups is at least two times the number of said wire affinity end groups, and at least 20 of said wire affinity end groups are present per $10^6$ carbon atoms. Alternatively, in this composition, the FEP has a sufficient number of wire affinity end groups to cause the FEP to exhibit a dissipation factor of at least about 0.0001 (at 1 GHz) greater than when said —$CF_3$ end groups constitute substantially all of the end groups of said copolymer. Preferably the FEP of this embodiment contains about 30 to 120 of the wire affinity end groups per $10^6$ carbon atoms. The addition of foam cell nucleating agent to this FEP makes the composition foamable. According to this embodiment, a single FEP can be used as the composition to produce the foamed insulation for coaxial cable exhibiting an average return loss of no greater than −26 dB at 800 MHz to 3GHz.

Each compositional embodiment has advantages. In the case of the composition containing a blend of FEPs, this enables the currently available low MFR FEP stabilized with —$CF_2H$ end groups to be used, with the high MFR FEP being used in varying amounts to satisfy the return loss requirement for the coaxial cable as well as idiosyncrasies of different commercial extrusion foaming operations. In the case of the single FEP compositional embodiment, the use of a single FEP saves the need for assembling two different FEPs.

Another embodiment of the present invention is the process for making coaxial cable, comprising (a) forming a foamed insulation on a central conductor by extrusion foaming on said conductor a composition comprising a foam cell nucleating agent and either (i) composition comprising a blend of tetrafluoroethylene/hexafluoropropylene copolymers, one of said copolymers exhibiting a strip force of at least about 3 lbf (13.3 N) and another of said copolymers exhibiting a strip force no greater than about 2.5 lbf (11.1 N), said blend exhibiting a strip force of at least about 3 lbf (13.3 N), each said strip force being the force necessary to break adhesion between conductor and said one of said copolymers, said another of said copolymers, and said blend, respectively, or (ii) composition comprising tetrafluoroethylene/hexafluoropropylene copolymer having an MFR of no greater than about 16 g/10 min and containing —$CF_3$ end groups and an effective amount of wire affinity end groups to exhibit a strip force of at least about 3 lbf (13.3 N), said strip force being the force necessary to break adhesion between conductor and said copolymer, said coaxial cable exhibiting an average return loss of no greater than about −26 dB at 800 MHz to 3 GHz and having a void content of about 20 to 65% and (b) forming an outer conductor over said foamed insulation. It has been customary to heat the central conductor so in effect, the wire is hot as the foamable composition is extruded onto the wire. This has been considered important when the low MFR —$CF_2H$ stabilized FEP has been used by itself to establish some drag (adhesion) between the foam insulation and the central conductor, and wire temperatures greater than 200° F. (93° C.) have consistently been used for this purpose. Contrary to the ability of molten PFA to adhere to conductor wire, typically of copper, molten FEP does not adhere to the central conductor until the conductor is sufficiently hot. The disadvantage of heating the wire above 200° F., usually greater than 210° F. (99° C.) is that the hot wire adversely affects the foam cell size and distribution (uniformity) in the foamed insulation adjacent to the conductor, which leads to high return loss. Surprisingly, the process of the present invention achieves both good extrusion foaming results and foam cell uniformity by having the conductor heated to a lower temperature than customarily used, i.e. the conductor heating temperature central conductor is preferably heated to a temperature of no greater than about 200° F. (93° C.), preferably no greater than about 190° F. (88° C.).

Another embodiment of the present invention is the coaxial cable comprising a central conductor, a foamed insulation on said central conductor, and an outer conductor over said foamed insulation, the foamed insulation having a void content of about 20 to 65% and an average return loss of no greater than about −26 dB at 800 MHz to 3 GHz, the foamed insulation comprising a composition tetrafluoroethylene/hexafluoropropylene copolymer exhibiting a strip force with respect to said central conductor of at least about 3 lbf (13.3 N). Preferably, the foamed insulation of the coaxial cable has a void content is about 45 to 60%, and preferably, the thickness of the foamed insulation is at least about 0.020 in (0.5 mm). The foamed insulation can be formed either from the FEP blend or single FEP compositions described above.

DETAILED DESCRIPTION OF THE INVENTION

The FEPs used in the present invention have a composition, insofar as the polymer chain is concerned, that can be described generically, i.e. the FEPs are all copolymers of tetrafluoroethylene (TFE) and hexafluoropropylene (HFP). In these copolymers, the HFP content is typically about 6-17 wt %, preferably 9-17 wt % (calculated from HFPI×3.2). HFPI (HFP Index) is the ratio of infrared radiation (IR) absorbances at specified IR wavelengths as disclosed in U.S. Statutory Invention Registration H130. Preferably, the TFE/HFP copolymer includes a small amount of additional comonomer to improve properties. The preferred TFE/HFP copolymer is TFE/HFP/perfluoro(alkyl vinyl ether) (PAVE), wherein the alkyl group contains 1 to 4 carbon atoms. Preferred PAVE monomers are perfluoro(ethyl vinyl ether)(PEVE) and perfluoro(propyl vinyl ether) (PPVE). Preferred TFE/HFP copolymers containing the additional comonomer have an HFP content of about 6-17 wt %, preferably 9-17 wt % and PAVE content, preferably PEVE, of about 0.2 to 3 wt %, with the remainder of the copolymer being TFE to total 100 wt % of the copolymer. Examples of FEP compositions are those disclosed in U.S. Pat. No. 4,029,868 (Carlson), U.S. Pat. No. 5,677,404 (Blair), and U.S. Pat. No. 6,541,588 (Kaulbfach et al.) and in U.S. Statutory Invention Registration H130. The FEP is partially crystalline, that is, it is not an elastomer. By partially crystalline is meant that the polymers have some crystallinity and are characterized by a detectable melting point measured according to ASTM D 3418, and a melting endotherm of at least about 3 J/g.

The FEP used in the present invention is also melt-fabricable, i.e. the polymer is sufficiently flowable in the molten state that it can be fabricated by melt processing such as extrusion, to produce wire insulation having sufficient strength so as to be useful. The melt flow rate (MFR) of the perfluoropolymers used in the present invention is preferably in the range of about 5 g/10 min to about 50 g/10 and is typically controlled by varying initiator feed during polymerization as disclosed in U.S. Pat. No. 7,122,609 (Chapman). The lower the initiator concentration in the polymerization medium for given polymerization conditions and copolymer composition, the higher the molecular weight, and the lower the MFR. MFR is measured according to ASTM D-1238 using a 5 kg weight on the molten polymer and at the melt temperature of 372° C. as set forth in ASTM D 2116-91a. Thus, the low MFR FEP (MFR no greater than about 10 g/10 min) used in the present invention can be prepared by using a low initiator concentration. To obtain (i) the FEP having an MFR of no greater than about 16 g/10 min and (ii) the FEP having an MFR of at least about 20 g/10 min, the initiator concentration need only be increased a small amount to obtain FEP (i) and a larger amount to obtain FEP (ii). Further increases in initiator concentration will produce FEP of even higher MFR. Preferably the FEP (ii) has an MFR of at least 25 g/10 min. Similar results can be obtained with the use of chain transfer agent in increasing amounts. The MFR of the composition used in the foaming process to make the foam insulated coaxial cable is preferably low enough that the coaxial cable made for the foamed composition passes the NFPA 262 test. For some cables, an MFR of no greater than about 16 g/10 min will suffice. Preferably however, the MFR of the compositions containing the plurality of FEPs and the single FEP as described above is no greater than about 12 g/10 min, more preferably no greater than 10 g/10 min, and most preferably no greater than about 8 g/10 min. In addition to the relationship of MFR to resistance to dripping during the NFPA 262 test, the relatively low MFR is desirable so that the foam does not collapse prior to cooling after extrusion foaming.

The chemical composition of the FEPs used in the composition containing a plurality of FEPs can be the same or different with respect to the polymer chain, within the composition ranges specified above. Preferably, these compositions are similar enough that the individual FEPs become indistinguishable from one another as a result of the blending occurring during extrusion foaming. These compositions can be formed by extrusion into pellets containing each FEP, which are then extrusion foamed to form the insulation for coaxial cable, or by blending together pellets of each FEP in the extrusion foaming process.

FEP as-polymerized contains at least about 400 end groups per $10^6$ carbon atoms. Most of these end groups are unstable in the sense that when exposed to heat, such as is encountered during extrusion, they undergo chemical reaction such as decomposition, either discoloring the extruded polymer or filling it with non-uniform bubbles or both. Examples of these unstable end groups are mentioned above and are determined by such polymerization aspects as choice of polymerization medium, initiator, chain transfer agent, if any, buffer if any, and polymer instability, i.e. the presence of the terminal end group —CF=$CF_2$ typically resulting from the decarboxylation of the end group. Thus, the identity of the unstable end groups will depend on the polymerization process used. These unstable end groups have an affinity for metal, which enables the FEP insulation to adhere to the wire conductor. It is expected that different unstable end groups will have different affinities for the wire conductor, whereby the number of these unstable end groups necessary to achieve the desired strip force of at least about 3 lbf (13.3 N) for the foamed insulation will vary with the identity of the end groups. The FEP of the desired MFR, as described above, can then be exposed to stabilization treatment to obtain the end group population and identity as described above. Exposure of the copolymer to steam is disclosed in U.S. Pat. No. 3,085,083 (Schreyer). Exposure of the FEP to fluorine is disclosed in U.S. Pat. No. 4,742,122 (Buckmaster et al.) and U.S. Pat. No. 4,743,658 (Imbalzano et al.). These processes can be used in the present invention. The analysis of end groups is described in these patents. The presence of the —CF3 stable end group is deduced from the absence of unstable end groups existing after the fluorine treatment. The number of unstable end groups remaining on the FEP after steam treatment or fluorination is controlled by the treatment conditions. The conditions disclosed in the patents mentioned above for producing stabilized FEP are simply lessened by either a shorter time of exposure or conducting the exposure at a lower temperature or reducing the fluorine concentration in the fluorine/nitrogen mixture used or any combination of these changes to produce the end group population desired. Since the resulting FEP will require some tailoring as to unstable end group population for a particular insulated wire system, some experimentation is necessary to produce several FEPs of different end group populations to obtain the strip force and thus, the electrical results desired.

The humid heat treatment and fluorination treatments are normally carried out to convert substantially all the unstable end groups to the stabilized end group. The resultant stabilized FEPs have a low number of unstabilized (wire affinity) end groups such that they exhibit low strip forces, i.e. less than about 2.5 lbf (11.1 N), more typically less than about 2 lbf (8.9 N).

The stabilized FEP has an undesirably high dissipation factor when the stabilized end group is —$CF_2H$, i.e. 0.0009 at 1 GHz. When stabilized with the —$CF_3$ end group, the dissipation factor is lower, e.g. less than 0.0004 at 1 GHz. These are the dissipation factors when the FEP is formed by polymerization in the absence of any alkali metal such as might be used as polymerization initiator, e.g. potassium persulfate. Preferably ammonium persulfate or other non-alkali metal initiator such as the peroxides disclosed in U.S. Pat. No. 6,743,508, is used. It has been found that the —$CF_2H$ stabilized FEP can be used in the present invention as the low MFR FEP in the composition containing the blend of FEPs. The improved return loss resulting from this composition outweighs the dissipation factor disadvantage in providing a coaxial cable of acceptable attenuation The amount of high strip force FEP present in the blend composition is that which is effective to produce a return loss of no greater than about −26 dB at 1 GHz. Preferably the MFR of this composition is no greater than about 16 g/10 min, more preferably no greater than about 12 g/10 min, still more preferably no greater than about 10 g/10 min for the thicker foamed insulations. Generally, the high and low strip force FEPs will be present in amounts from about 30 to about 70 wt % of each FEP, based on their combined weight to total 100%. The high strip force FEP in the blend can itself be a blend of FEPs having a different number of wire affinity end groups, e.g. FEP having a large number of wire affinity end groups, which has been diluted by mixing with an FEP having a lower number of wire affinity end groups to provide the average number of wire affinity end groups for the strip force desired.

The foam cell nucleating agents added to the FEP compositions of the present invention to make the compositions foamable are thermally stable under extruder processing conditions. Examples of such agents include those disclosed in U.S. Pat. No. 4,877,815 (Buckmaster et al.), namely thermally stable organic acids and salts of sulfonic acid or phosphonic acid, preferably in combination with boron nitride and a thermally stable inorganic salt disclosed in U.S. Pat. No. 4,764,538. The preferred organic acid or salt has the formula $(F(CF_2)_nCH_2CH_2$-sulfonic or phosphonic acid or salt, wherein n is 6, 8, 10, or 12 or a mixture thereof. The sulfonic acid can be referred to as TBSA. Thus, a particular salt of TBSA can be described by identity of the salt and the number of $CF_2$ groups in the TBSA, e.g. KS-6 TBSA means the potassium salt of TBSA wherein 6 $CF_2$ groups are present in the TBSA. Another preferred organic acid and salt is the perfluoroalkanesulfonic or phosphonic acid or salt. Examples of these acids and salts are given in the following Table.

TABLE 1

| | |
|---|---|
| ZrS-10 | zirconium (+4) salt of TBSA |
| CrS-10 | chromium (+3) salt of TBSA |
| CeS-10 | cerium (+4) salt of TBSA |

TABLE 1-continued

| | |
|---|---|
| KS-10 | potassium salt of TBSA |
| HS-10 | TBSA |
| AS-10 | aluminum salt of TBSA |
| SrS-10 | strontium salt of TBSA |
| CaS-10 | calcium salt of TBSA |
| ZnS-10 | zinc salt of TBSA |
| BaS-10 | barium salt of TBSA |
| LS-10 | lithium salt of TBSA |
| FS-10 | iron (+3) salt of TBSA |
| TEAS-10 | triethylamine salt of TBSA |
| BS-6A | barium p-(perfluoro[1,3-dimethylbfutyl]) benzene sulfonate |
| BS-9A | barium p-(perfluoro[1,3,5-trimethylhexyl]) benzene sulfonate |
| BaS-A1(H) | barium p-toluene sulfonate |
| BaP-A | barium benzene phosphonate |
| NaP-A | sodium benzene phosphonate |
| NaS-A(II) | 4,5-dihydroxy-m-benzene disulfonic acid disodium salt |
| NaS-6 | sodium salt of TBSA |
| BS-6 | barium salt of TBSA |
| BS-8 | barium salt of TBSA |
| KS-6 | potassium salt of TBSA |
| KS-8 | potassium salt of TBSA |
| KS-8C | potassium perfluorocyclohexylethane sulfonate |
| NaS-1 | sodium trifluoromethane sulfonate |
| KS-1 | potassium trifluoromethane sulfonate |
| KS-1(H) | potassium methane sulfonate |
| BaS-3(H) | barium propane sulfonate |
| NaTCA | sodium trichloroacetate |

Examples of inorganic salts include carbonates, tetraborates, phosphates, and sulfates of such cations as lithium, sodium, potassium, and calcium. The preferred inorganic salt is calcium tetraborate. The amount of foam cell nucleating agent used is that which is effective to produce the void content desired, 20-65%, preferably 45 to 60% in the foamed insulation. Generally this amount will be 0.01 to 1 wt % based on the weight of the FEP. The proportions of the components of the foam cell nucleating agent are adjusted to obtain the uniform cell size desired, generally about 50 micrometers and smaller. The uniformity in cell size contributes to low return loss by not reflecting back transmitted signals along the coaxial cable. The incorporation of the foam cell nucleating agent into the FEP compositions renders them foamable in an extrusion process in the present of either gas injection into the polymer melt or the addition of chemical blowing agent to the melt. The foam cell nucleating agent is incorporated into the FEP composition either by blending with the FEP in the form of a powder for pelletizing, so that the pellets include the foam cell nucleating agent mixed with the FEP, or with the FEP pellets for co-feeding into the extruder.

Preferably, the dissipation factor of the FEP compositions is no greater than about 0.0005 at 1 GHz. Dissipation factor is measured on compression molded plaques in accordance with ASTM D 2520 as disclosed in EP 0 423 995.

The formation of coaxial cable and the extrusion foaming process is conventional except for the use of the compositions of the present invention to form the foam insulation about the central conductor and other conditions to be mentioned hereinafter. The dimensions of the coaxial cable to which the present invention is especially applicable is as follows: central conductor of copper having a diameter of about 0.015 in (0.8 mm) to 0.065 in (1.7 mm) and foamed insulation thickness of 0.02 to 0.12 in (0.51 to 2.5 mm), over which the shielding tape is wrapped and then the outer conductor is braided. The smaller diameter central conductors are foam insulated with the thinner wall thickness foam insulations, e.g. a central conductor diameter of 0.0179 in (0.45 mm) typically has a foam insulation wall thickness of about 0.029 in (0.74 mm), and a 0.064 in (1.6 mm) diameter central conductor typically has a foam insulation wall thickness of about 0.11 in (2.8 mm). The lower void contents are typically present in the thinner foam insulation wall thicknesses. Thus for foam insulation wall thicknesses of 0.05 in (1.3 mm) and above, the void content will generally be in the range of 40-65%. The temperature at the adapter crosshead of the extruder is heated to about 650-675° F. (343-357° C.). The temperature of the heated central conductor, however, is relatively cold, i.e. at a temperature of no greater than about 200° F. (93° C.). While this "cold" conductor increases the difficulty for the FEP composition to adhere to the conductor, the cold conductor promotes uniformity in cell size. Heating of the conductor to higher temperatures causes bubble size irregularity adjacent the conductor by virtue of the heat in the conductor preventing the setting up of the bubble structure in that region. Line speeds for the extrusion foaming process to form the foamed insulation around the central conductor tend to be low, especially for the thicker wall thicknesses of foamed insulation, because of the difficulty in cooling the foam-insulated central conductor before it is wound up. Winding up the foam insulted central conductor before the insulation is cool results in a flattening of the foam insulation. Thus, for foam insulation wall thicknesses of 0.05 in and above, line speed is usually no greater than 125 ft/min (38.1 m/min).

EXAMPLES

FEP A used in these Examples is a commercially available (from E.I. du Pont de Nemours and Company (DuPont)) fluoropolymer having an MFR 7 g/10 min and containing from 10 to 11 wt % HFP, the remainder being TFE. The polymer has been stabilized by the well known humid heat treatment to have its polymerization-source end groups converted to the stable —$CF_2H$ end group.

FEP B used in these Examples is a commercially available (from DuPont) fluoropolymer containing 10 to 11 wt % HFP and 1-1.5 wt % PEVE, the remainder being TFE. This FEP has an MFR 30 g/10 min and has about 50 wire affinity end groups per $10^6$ carbon atoms, these wire affinity end groups arising from the polymerization process. The remaining end groups are the stable —$CF_3$ end group obtained by fluorination of the FEP. The extruder fluorination procedure of Example 2 of U.S. Pat. No. 6,838,545 (Chapman) is used except that the fluorine concentration is reduced from 2500 ppm in the '545 Example to 900 ppm. For FEP, a fluorine concentration of 1200 ppm in the extruder fluorination process is sufficient to reduce the number of wire affinity end groups to less than about 10 per $10^6$ carbon atoms The foam cell nucleating agent is a mixture of 91.1 wt % boron nitride, 2.5 wt % calcium tetraborate and 6.4 wt % of the barium salt of telomer B sulfonic acid, to total 100% of the combination of these ingredients, as disclosed in U.S. Pat. No. 4,877,815 (Buckmaster et al.). This agent is provided as a 2.5 wt % concentrate in PFA 340 commercially available from DuPont, based on the total weight of the concentrate.

To form a foamable FEP composition, extruded pellets of the foam cell nucleating agent concentrate are dry blended with pellets of the FEP and then subjected to the extrusion wire coating/foaming process.

Return loss is determined on a 100 ft (30.5 m) length of coaxial cable by measuring signal loss in both directions along the cable and averaging the two measurements. The signal loss is measured at 801 frequencies uniformly spaced apart in a sequential frequency sweep from 800 MHz to 3 GHz and the return losses from this sweep are averaged to obtain the average return loss over this range of frequencies. An Agilent Technologies Network Analyzer can be used to make these measurements and provide readout of the average return loss.

Strip force is the force necessary to break the adhesive bond between the foamed insulation of the coaxial cable and the wire conductor and is determined on a length of coaxial cable consisting of 3 in (7.6 cm) of the coaxial cable and 1 in (2.5 cm) of copper conductor with the foamed insulation and overlying outer conductor stripped away. The wire conductor is copper since that is the most common wire conductor material. This length of coaxial cable is placed in a slot within a stationary metal plate, the slot being wide enough to accommodate the central conductor pointing downwardly, but not to permit passage of the portion of the coaxial cable containing the foamed insulation and outer conductor through the slot. The downwardly extending copper conductor is gripped by a jaw of an INSTRON® tensile testing machine and the jaw is moved away from the slot at a rate of 5.1 cm/min. The strip force is the force causing the foamed insulation to breakaway from the copper conductor so that the conductor can then be pulled from the foamed insulation. This test is carried out at ambient temperature (15° C. to 20° C.), and the temperature of the wire conductor at which the FEP composition is applied to the conductor is no greater than about 200° F. (93° C.).

Void content of the foamed insulation is calculated from the equation:

$$\text{Void Content (\%)} = 100 \times (1 - d_{(foamed)}/d_{(unfoamed)}).$$

The density of the foamed insulation is determined by cutting a length of insulated conductor, removing the insulation, measuring the volume in cubic centimeters of the insulation and dividing that value into the weight in grams of the insulation. The density is the average of measurements of at least 5 samples, each being ~30 cm in length. The density of the unfoamed insulation is 2.15 g/cm$^3$.

Example 1

A dry blend of 50 parts by weight of FEP A and 50 parts by weight of FEP B, together with foam cell nucleating agent concentrate is formed wherein the wt % of the nucleating agent is 0.25 wt %, based on the total weight of the composition. The MFR of the blend is 14 g/10 min. The extrusion foaming conditions are conventional. The melt temperature at the junction between the extruder and the cross head for the central copper conductor feed is 345° C. The extruder is injected with nitrogen gas at high pressure. The draw down ratio (e.g. DDR, in a tubular die, is defined as the ratio of the cross-sectional area of the annular die opening to the cross-sectional area of the finished insulation) of the extruded fluoropolymer composition is about 5 and the temperature of the copper conductor is 190° F. (88° C.). The extrusion conditions are such that the foaming is delayed until the extruded polymer is in contact with the copper conductor. The foam insulated wire is then formed into a coaxial cable by conventional procedure, including the braiding of strips of conductive metal over the foamed insulation to form the outer conductor and the application of a polymer jacket over the outer conductor. The line speed of the extrusion foaming process is 120 ft/min (36.6 m/min). The dimensions of the coaxial cable are 0.032 in (0.8 mm) diameter central conductor and outer foam diameter of 0.135 in (3.4 mm), whereby the thickness of the foamed insulation is about 0.050 in (1.27 mm). The void content of the foamed insulation is 55%.

This coaxial cable exhibits a return loss of −30 dB at 1 GHz, and the strip force required to break the adhesion between the foamed insulation and the central conductor is 4 lbf (17.8 N). Similar results are obtained when the PFA 340 fluoropolymer of the concentrate is replaced by FEP B. Similar results are also obtained when the foam cell nucleating agent is mixed directly with the FEP composition to be extrusion foamed, rather than using a polymer concentrate of the foam cell nucleating agent.

Example 2

Similar return loss and strip force are obtained for coaxial cable made in accordance with Example 1 except that FEP B has about 100 as polymerized end groups, the remaining end groups being —$CF_3$ obtained by extrusion fluorination as described above, except that the fluorine concentration is reduced to 600 ppm.

Example 3

Instead of the blend of FEPs A and B being used, a single FEP is made to provide the same return loss and strip force result as Example 1. This single FEP is made by the polymerization process of Example 6 of U.S. Pat. No. 5,677,404 (Blair). This FEP is fluorinated by the extruder fluorination process described above, using a fluorine concentration of 900 ppm, to obtain a similar number (about 50/$10^6$ carbon atoms) of as-polymerized wire affinity end groups, the remaining end groups being —$CF_3$. A foamable composition is made by dry blending this single FEP with foam cell nucleating agent concentrate in the same concentration as in Example 1, and coaxial cable is made by the process of Example 1, resulting in a coaxial cable of the same dimensions and about the same void content, exhibiting a return loss of −30 dB at 1 GHz and strip force of greater than 3 lbf (13.3 N).

Comparative Example

In this Example, coaxial cable of the same dimensions of Example 1 is formed using FEP A as the sole fluoropolymer. FEP A and foam cell nucleating agent concentrate are dry blended to obtain the same concentration of foam cell nucleating agent as Example 1 and the extrusion foaming process is similar to that of Example 1 except that the line speed is 90 ft/min (27 m/min). The resultant coaxial cable exhibits a return loss of −20 dB at 1 GHz and strip force of 1.5 lbf (6.7 N).

The invention claimed is:

1. Coaxial cable comprising a central conductor, a foamed insulation on said central conductor, and an outer conductor over said foamed insulation, said foamed insulation having a void content of about 20 to 65% and an average return loss of no greater than about −26 dB at 800 MHz to 3 GHz, said foamed insulation comprising tetrafluoroethylene/hexafluoropropylene copolymer exhibiting a strip force with respect to said central conductor of at least about 3 lbf (13.3 N).

2. The coaxial cable of claim 1 wherein said void content is about 45 to 60%.

3. The coaxial cable of claim 1 wherein the thickness of said foamed insulation is at least about 0.020 in (0.5 mm).

4. Composition comprising a blend of tetrafluoroethylene/hexafluoropropylene copolymers, one of said copolymers exhibiting a strip force of at least about 3 lbf (13.3 N) and another of said copolymers exhibiting a strip force no greater than about 2.5 lbf (11.1 N), said blend exhibiting a strip force of at least about 3 lbf (13.3 N), each said strip force being the force necessary to break adhesion between conductor and said one of said copolymers, said another of said copolymers, and said blend, respectively.

5. The composition of claim 4 wherein said copolymer having said strip force of at least about 3 lbf (13.3 N) has an MFR of at least about 16 g/10 min and said copolymer having said strip force of no greater than about 2.5 lbf (11.1 N) has an MFR of no greater than about 10 g/10 min.

6. The composition of claim 4 wherein said copolymer having said strip force of at least about 3 lbf (13.3 N) has wire affinity end groups and stable end groups.

7. The composition of claim 6 wherein said stable end groups are —$CF_2H$ or —$CF_3$.

8. The composition of claim 6 wherein said wire affinity end groups constitute about 30 to 120 of such end groups per $10^6$ carbon atoms.

9. The composition of claim 4 comprising about 30-70 wt % of each said copolymers based on their combined weight to total 100 wt %.

10. The composition of claim 4 wherein one of said one and another copolymers contains —$CF_2H$ end groups and the other of said one and another copolymers contains —$CF_3$ end groups.

11. The composition of claim 4 comprising foam cell nucleating agent, whereby said composition is foamable.

12. The composition of claim 4 as a foamed insulation in coaxial cable exhibiting an average return loss of no greater than about −26 dB at 800 MHz to 3 GHz.

13. Composition comprising tetrafluoroethylene/hexafluoropropylene copolymer having an MFR of no greater than about 16 g/10 min and containing —$CF_3$ end groups and an effective amount of wire affinity end groups to exhibit a strip force of at least about 3 lbf (13.3 N), said strip force being the force necessary to break adhesion between conductor and said copolymer.

14. The composition of claim 13 wherein the number of said —$CF_3$ end groups is at least two times the number of said wire affinity end groups, and at least 20 of said wire affinity end groups being present per $10^6$ carbon atoms.

15. The composition of claim 13 comprising foam cell nucleating agent, whereby said composition is foamable.

16. The composition of claim 13 wherein the number of said wire affinity end groups present causes said copolymer to exhibit a dissipation factor of at least about 0.0001 greater than when said —$CF_3$ end groups constitute substantially all of the end groups of said copolymer.

17. The composition of claim 13 wherein said copolymer contains about 30 to 120 of said wire affinity end groups per $10^6$ carbon atoms.

18. Process for making coaxial cable, comprising (a) forming a foamed insulation on a central conductor by extrusion foaming on said conductor a composition comprising a foam cell nucleating agent and either (i) composition comprising a blend of tetrafluoroethylene/hexafluoropropylene copolymers, one of said copolymers exhibiting a strip force of at least about 3 lbf (13.3 N) and another of said copolymers exhibiting a strip force no greater than about 2.5 lbf (11.1 N), said blend exhibiting a strip force of at least about 3 lbf (13.3 N), each said strip force being the force necessary to break adhesion between conductor and said one of said copolymers, said another of said copolymers, and said blend, respectively, or, (ii) composition comprising tetrafluoroethylene/hexafluoropropylene copolymer having an MFR of no greater than about 16 g/10 min and containing —$CF_3$ end groups and an effective amount of wire affinity end groups to exhibit a strip force of at least about 3 lbf (13.3 N), said strip force being the force necessary to break adhesion between conductor and said copolymer, said coaxial cable exhibiting an average return loss of no greater than about −26 dB at 800 MHz to 3 GHz and having a void content of about 20 to 65% and (b) forming an outer conductor over said foamed insulation.

19. The process of claim 18 wherein during said extrusion foaming on said central conductor, said central conductor is heated to a temperature of no greater than about 200° F. (93° C.).

* * * * *